United States Patent
Zhou et al.

(10) Patent No.: US 10,368,260 B2
(45) Date of Patent: Jul. 30, 2019

(54) METHOD AND UE FOR MEASURING CSI-RS

(71) Applicant: Samsung Electronics Co., Ltd., Gyeonggi-do (KR)

(72) Inventors: Xutao Zhou, Beijing (CN); Haijie Qui, Beijing (CN); Chengjun Sun, Beijing (CN); Zixiong Chen, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 193 days.

(21) Appl. No.: 14/436,854

(22) PCT Filed: Oct. 18, 2013

(86) PCT No.: PCT/KR2013/009335
§ 371 (c)(1),
(2) Date: Apr. 17, 2015

(87) PCT Pub. No.: WO2014/062029
PCT Pub. Date: Apr. 24, 2014

(65) Prior Publication Data
US 2016/0174093 A1    Jun. 16, 2016

(30) Foreign Application Priority Data

Oct. 19, 2012    (CN) .......................... 2012 1 0399121

(51) Int. Cl.
*H04W 24/10* (2009.01)
*H04L 5/00* (2006.01)

(52) U.S. Cl.
CPC .......... *H04W 24/10* (2013.01); *H04L 5/0057* (2013.01); *H04L 5/0094* (2013.01); *H04L 5/005* (2013.01)

(58) Field of Classification Search
CPC ...... H04W 24/10; H04L 5/005; H04L 5/0057; H04L 5/0094
See application file for complete search history.

(56) References Cited

U.S. PATENT DOCUMENTS

2009/0054093 A1    2/2009  Kim et al.
2012/0076040 A1    3/2012  Hoshino et al.
(Continued)

FOREIGN PATENT DOCUMENTS

CN    102684850 A    9/2012
CN    102696183 A    9/2012
(Continued)

OTHER PUBLICATIONS

International Search Report dated Jan. 28, 2014 in connection with International Patent Application No. PCT/KR2013/009335, 4 pages.
(Continued)

*Primary Examiner* — Ricky Q Ngo
*Assistant Examiner* — Stephen N Steiner

(57) ABSTRACT

An example of the present disclosure provides a method and User Equipment (UE) apparatus for measuring a Channel State Indication (CSI)-Reference Signal (RS), by utilizing multiple CSI-RS resources, which includes: receiving, by a User Equipment (UE), a signaling, in which the signaling indicates a multiple CSI-RS resource combination, which corresponds to a CSI-RS Reference Signal Receiving Power (RSRP), and/or, a CSI-RS Reference Signal Receiving Quality (RSRQ), and corresponding configuration information; obtaining, by the UE, a resource location corresponding to the obtained multiple CSI-RS resource combination, and the corresponding configuration information from the signaling; measuring, by the UE, the CSI-RS at the corresponding resource location, and reporting a measurement result.

14 Claims, 6 Drawing Sheets

(56) References Cited

U.S. PATENT DOCUMENTS

2012/0207199 A1* 8/2012 Guo .................. H04L 1/0026
375/224
2012/0287875 A1 11/2012 Kim et al.
2013/0208604 A1* 8/2013 Lee .................. H04L 25/0226
370/252

FOREIGN PATENT DOCUMENTS

WO          2012/124552 A1   9/2012
WO    WO 2012/124552 A1     9/2012

OTHER PUBLICATIONS

Ericsson et al., "Aspects on Distributed RRUs with Shared Cell-D for Heterogeneous Deployments", 3GPP TSG-RAN WG1 #64, Taipei, Taiwan, Feb. 21-25, 2011, 11 pages.
ZTE, "Discussion on CoMP Resource Management Set", 3GPP TSG RAN WG1 Meeting #69, Prague, Czech Republic, May 21-25, 2012, 6 pages.
Huawei, et al, "Consideration on CSI-RS Configuration", R2-111555/R1-11156, 3GPP TSG-RAN WG2 Meeting #73, Taipei, Taiwan, Feb. 21-25, 2011, 5 pages.
Alcatel-Lucent et al., "Remaining Issues for CSI-RS for CoMP", 3GPP TSG RAN WG1 meeting #69, May 21-25, 2012, 3 pages, R1-122485.
Office Action dated Aug. 10, 2018 in connection with Chinese Patent Application No. 201210399121.9, 20 pages.

* cited by examiner

[Fig. 1]
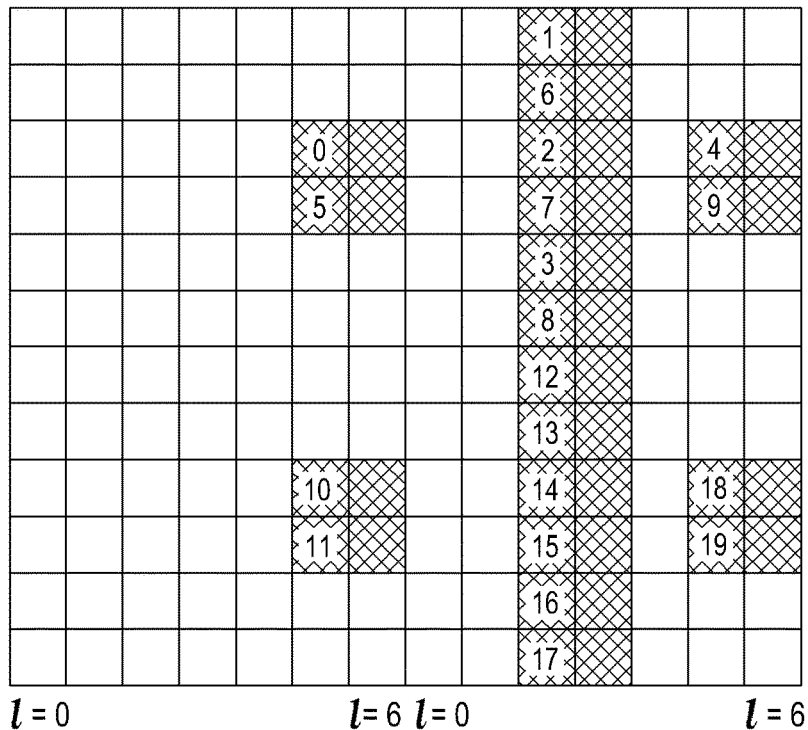
$l = 0$  $l = 6$  $l = 0$  $l = 6$
[Fig. 2]
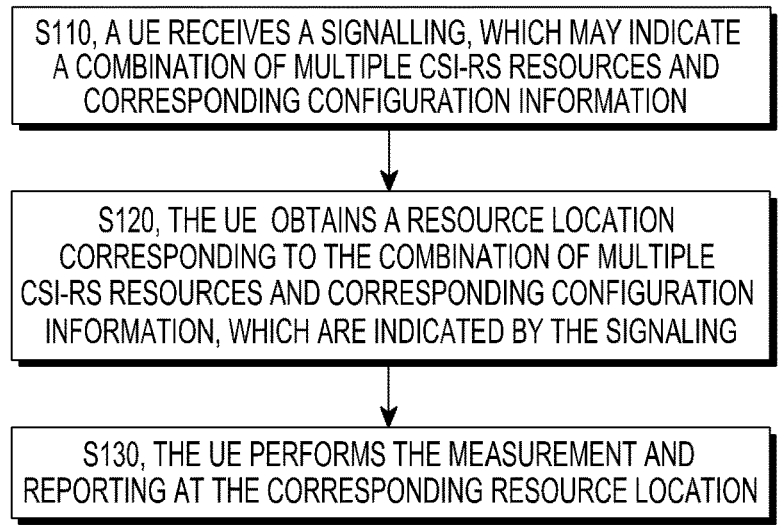
[Fig. 3]
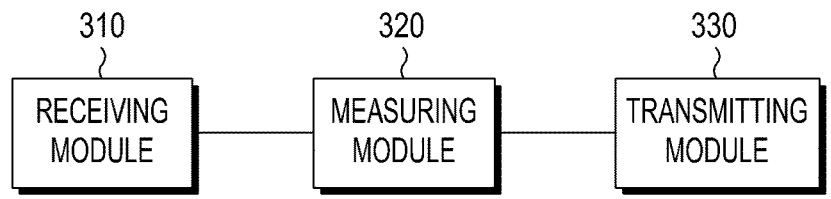

[Fig. 4]
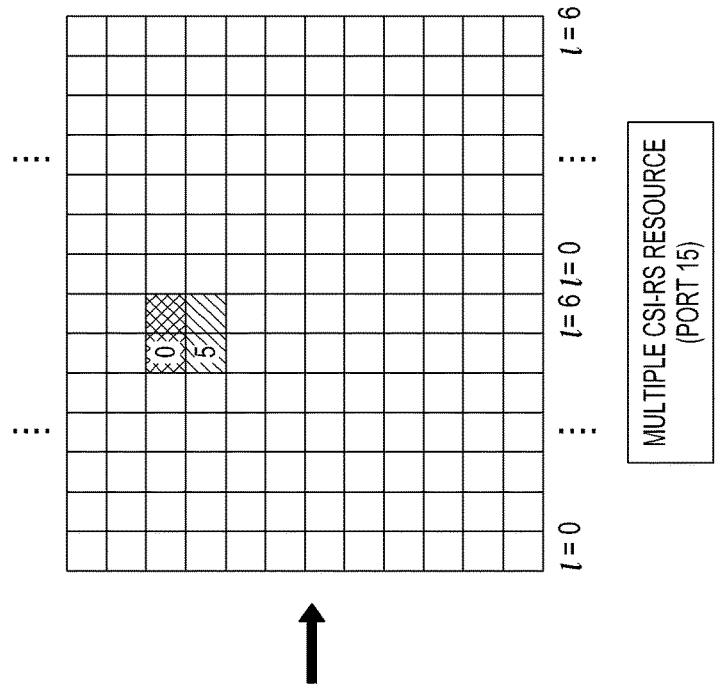
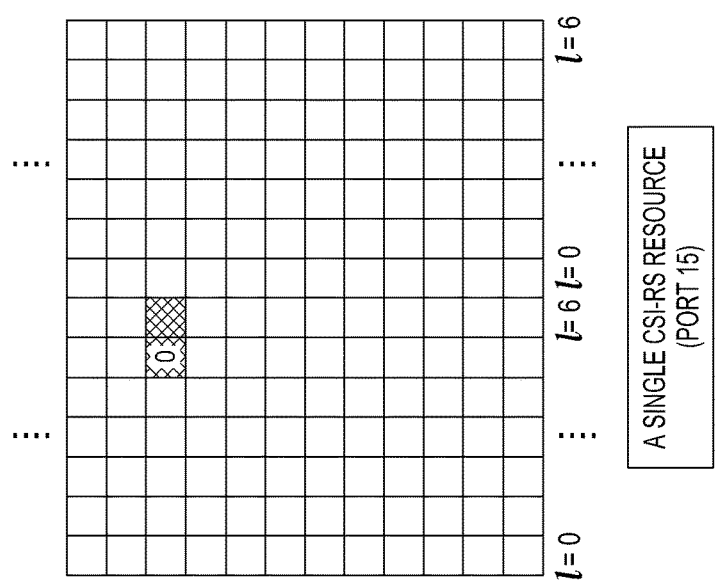
[Fig. 5]
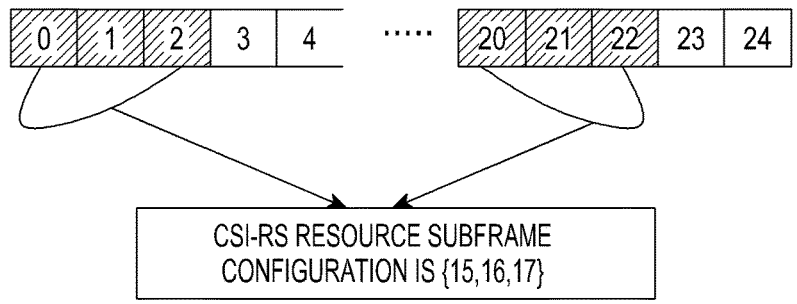

[Fig. 6]
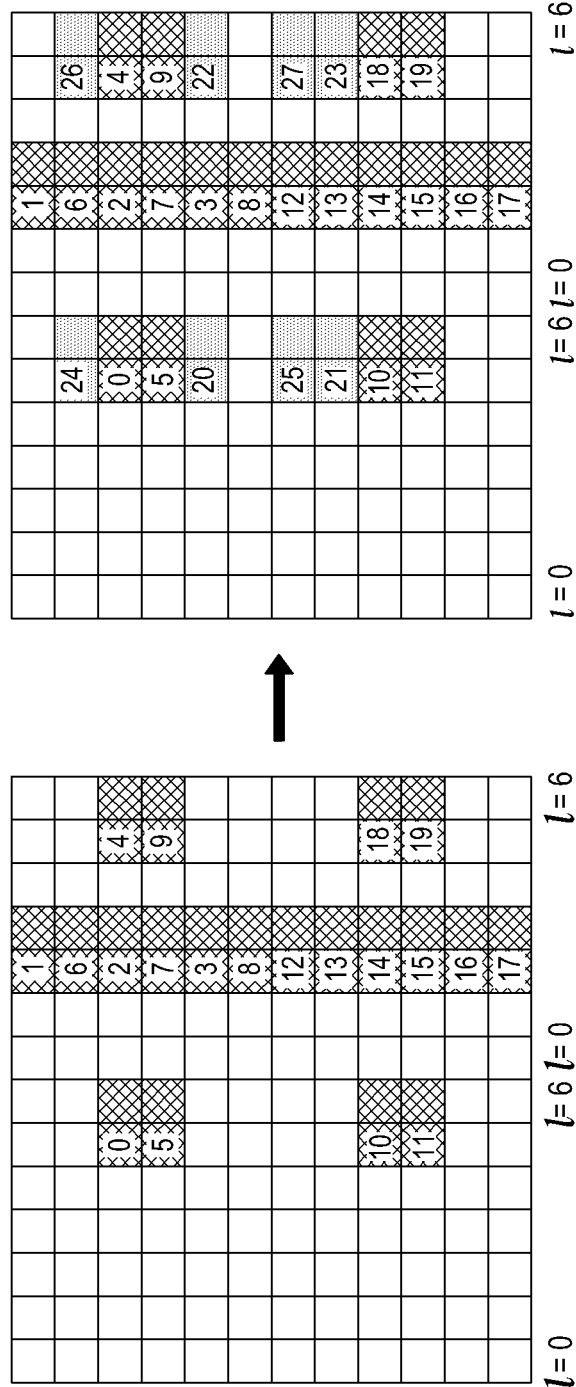

[Fig. 7]
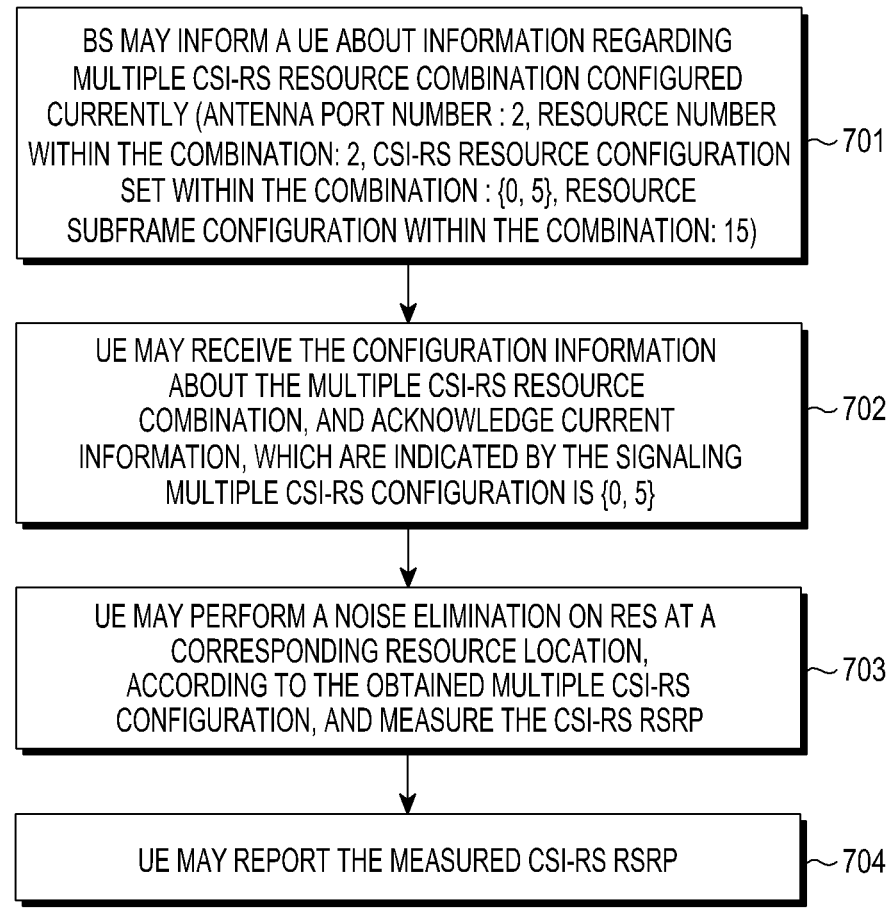

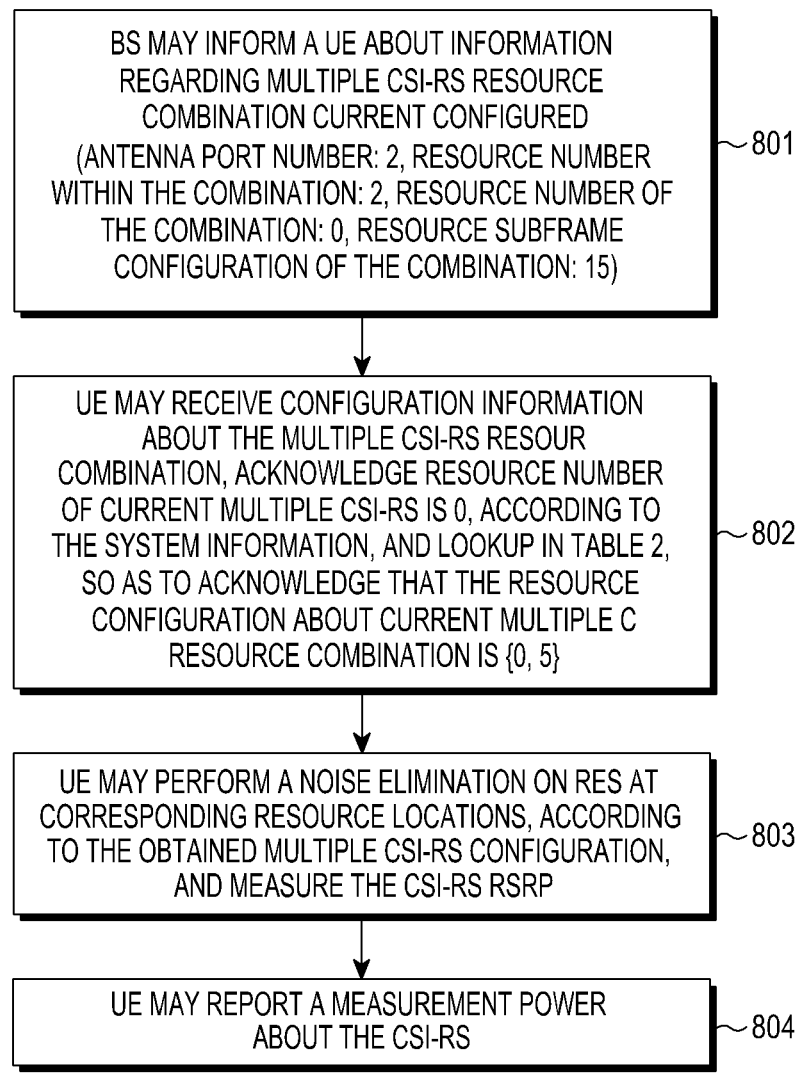
[Fig. 8]

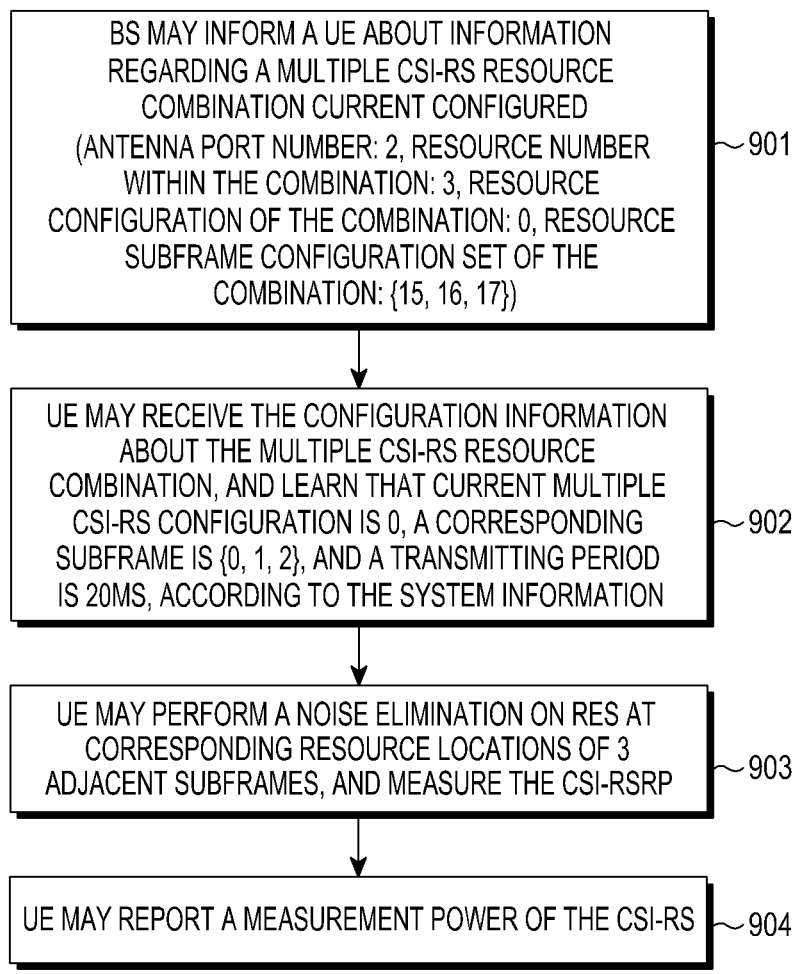
[Fig. 9]

METHOD AND UE FOR MEASURING CSI-RS

CROSS-REFERENCE TO RELATED APPLICATION(S)

The present application claims priority under 35 U.S.C. § 365 to International Patent Application No. PCT/KR2013/009335 filed Oct. 18, 2013, entitled "METHOD AND UE FOR MEASURING CSI-RS", and, through International Patent Application No. PCT/KR2013/009335, to Chinese Patent Application No. 201210399121.9 filed Oct. 19, 2012, each of which are incorporated herein by reference into the present disclosure as if fully set forth herein.

TECHNICAL FIELD

The present disclosure relates to radio communication technologies, and more particularly, to a method and a User Equipment (UE) for measuring a Channel State Indication (CSI)-Reference Signal (RS).

BACKGROUND ART

For a Long Term Evolution (LTE) system, Coordinated Multiple Point (CoMP) is an important feature. A CoMP operation may effectively improve a system peak rate and a throughput capacity of cell edge user.

During a moving of a User Equipment (UE), it is necessary to perform an effective management on a measurement set of CoMP channel information, so as to obtain a correct configuration and to feed back effective channel quality information. A UE needs to measure and report a CSI-RS Reference Signal Receiving Power (RSRP), so as to perform the effective management on the measurement set of the CoPM channel information about the UE. The CSI-RS RSRP refers to a receiving power of a CSI-RS, which measures a power of Resource Element (RE) located by the CSI-RS.

There are the following assumptions and definitions about measurement and reporting of the CSI-RS RSRP in current LTE system. In a management set of CoMP resources, each CSI-RS resource corresponds to measurement and reporting about a CSI-RS RSRP. To support measurement of a CSI-RS, each CSI-RS resource in the management set of the CoMP resource may include the following information: antenna port number, CSI-RS resource configuration, CSI-RS subframe configuration and scrambling initialization parameter.

DISCLOSURE OF INVENTION

Technical Problem

Each CSI-RS resource in a subframe corresponds to certain REs. Measurement accuracy about a CSI-RS RSRP largely depends on number of available REs in a Resource Block (RB). While a CSI-RS resource in an RB may be only mapped to 2 REs (when there are two antenna ports), sample number thereof is small. Subsequently, measurement accuracy of the CSI-RS RSRP may be poor, which may not meet requirements of a system.

Current standardization puts forward a method to improve the measurement accuracy, by increasing measurement bandwidth or increasing measurement period. However, when a system bandwidth is limited, the problem of poor measurement accuracy about the CSI-RS RSRP may not be solved, by employing the method for increasing the measurement bandwidth. Influence on the measurement accuracy, which is resulted from too small sample number in a subframe, may not be totally eliminated by employing the method for increasing measurement period. In addition, when employing the above two methods, implementation complexity and power consumption of a UE may be increased.

Thus, it is necessary to find a way to effectively solve the problem of poor measurement accuracy of the CSI-RS RSRP, which is not limited by measurement bandwidth of a system.

The present disclosure aims to solve at least one of foregoing technical deficiencies, and provides a technical solution, which is not limited by measurement bandwidth and measurement period of a system, so as to accurately measure a CSI-RS RSRP and CSI-RS RSRQ, when guaranteeing that a less power consumption and a lower complexity of a UE are maintained.

Solution to Problem

An example of the present disclosure provides a method for measuring a CSI-RS, including:
receiving, by a UE, a signaling, wherein the signaling indicates a multiple CSI-RS resource combination, which corresponds to a CSI-RS, and corresponding configuration information;
obtaining, by the UE, a resource location corresponding to the multiple CSI-RS resource combination, and the corresponding configuration information from the signaling;
measuring, by the UE, the CSI-RS at the corresponding resource location, and reporting a measurement result;
in which the measuring the CSI-RS includes:
measuring at least one of a CSI-RS RSRP and a CSI-RS RSRQ.

Preferably, the UE obtains information about the multiple CSI-RS resource combination from a broadcast message or a radio resource configuration message, which is transmitted by a Base Station (BS).

Preferably, the information about the multiple CSI-RS resource combination includes at least one of:
a size of the multiple CSI-RS resource combination;
an index corresponding to the multiple CSI-RS resource combination;
a CSI-RS configuration set corresponding to the multiple CSI-RS resource combination;
a CSI-RS subframe configuration set corresponding to the multiple CSI-RS resource combination; and
an RS configuration within the multiple CSI-RS resource combination.

Preferably, a combination mode about the multiple CSI-RS resource combination includes at least one of:
combining multiple CSI-RS resources of a same subframe, by selecting different CSI-RS configurations; and
combining multiple CSI-RS resources of different subframes, by selecting different CSI-RS subframe configurations.

Preferably, when combining by selecting multiple CSI-RS resources, a principle to be complied with includes:
randomly selecting from currently available CSI-RS resources;
or, selecting and combining CSI-RS resources with stronger CSI correlation, according to correlation characteristics about a time-frequency domain channel in currently available CSI-RS resources.

Preferably, a mode for selecting the CSI-RS resources with stronger CSI correlation includes:

selecting the CSI-RS resources adjacent in a frequency domain from a same subframe, and combining the selected CSI-RS resources;

selecting the CSI-RS resources with an adjacent subframe configuration from different subframes, and combining the selected CSI-RS resources.

Preferably, the selecting is based on an REs mapping about an existing CSI-RS resource, or an REs mapping about a newly designed CSI-RS resource;

and the REs mapping about the newly designed CSI-RS resource comprises:

adding available CSI-RS resources, which is based on the REs mapping about the existing CSI-RS resource;

or, modifying a location mapped to by the existing CSI-RS resource.

Preferably, the RS includes a cell specific RS, or a UE specific RS.

An example of the present disclosure provides a UE for measuring a Channel State Indication (CSI)-Reference Signal (RS), including a receiving module, a measuring module and a transmitting module, wherein the receiving module is configured to receive a signaling, and obtain from the signaling a multiple CSI-RS resource combination, which corresponds to a measured CSI-RS RSRP, and/or, a measured CSI-RS RSRQ, and corresponding configuration information;

the measuring module is configured to obtain a resource location corresponding to the multiple CSI-RS resource combination indicated by the signaling, and measure the CSI-RS RSRP, and/or, the CSI-RS RSRQ at the obtained resource location; and the transmitting module is configured to transmit a measurement result obtained by the measuring module.

Preferably, the receiving module is further configured to receive a broadcast message or a radio resource configuration message, which is transmitted by a BS, and obtain information about the multiple CSI-RS resource combination from the received broadcast message or radio resource configuration message.

Advantageous Effects of Invention

In view of above, it can be seen that an example of the present disclosure provides a technical solution, which may enable a UE to measure the CSI-RS RSRP or CSI-RS RSRQ, based on multiple CSI-RS resources, by reasonably selecting and configuring the multiple CSI-RS resources. By employing the technical solution, density of REs used for measuring the CSI-RS RSRP or the CSI-RS RSRQ may be increased. Meanwhile, a UE may be facilitated to eliminate a noise power, by selecting and combing CSI-RS resources with stronger CSI correlation.

Subsequently, accuracy about measurement of the CSI-RS RSRP and CSI-RS RSRQ implemented by a UE may be effectively improved, so as to report the accurate CSI-RS RSRP and CSI-RS RSRQ, and to perform an accurate management on a measurement set about CSI quality. In addition, by employing the foregoing technical solution provided by an example of the present disclosure, modification to an existing system may be small, which may not affect system compatibility. Meanwhile, implementation thereof may be simple and efficient.

BRIEF DESCRIPTION OF DRAWINGS

FIG. 1 is a schematic diagram illustrating a mapping of a CSI-RS resource in a subframe with two antenna ports.

FIG. 2 is a flowchart illustrating a method for measuring a CSI-RS RSRP, in accordance with an example of the present disclosure.

FIG. 3 is a schematic diagram illustrating structure of a UE, in accordance with an example of the present disclosure.

FIG. 4 is a schematic diagram illustrating how to combine multiple CSI-RS resources, by selecting different CSI-RS configurations, in accordance with an example of the present disclosure.

FIG. 5 is a schematic diagram illustrating how to combine multiple CSI-RS resources, by selecting different CSI-RS subframe configurations, in accordance with an example of the present disclosure.

FIG. 6 is a schematic diagram illustrating a REs mapping about a CSI-RS resource, in accordance with an example of the present disclosure.

FIG. 7 is a flowchart illustrating an application scene when a configured multiple CSI-RS resource combination is resource configurations 0 and 5 of a same subframe, in accordance with an example of the present disclosure.

FIG. 8 is a flowchart illustrating another application scene when a configured multiple CSI-RS resource combination is resources 0 and 5 of a same subframe of a newly designed resource mapping, in accordance with an example of the present disclosure.

FIG. 9 is a flowchart illustrating another application scene when a configured multiple CSI-RS resource combination is CSI-RS resources configured for different subframes, in accordance with an example of the present disclosure.

MODE FOR THE INVENTION

Examples of the present disclosure will be described in detail in the following. The examples are illustrated with the accompanying figures, in which a same or similar label may denote a same or similar component, or components with same or similar functions. Examples described in the following with attached figures are exemplary, which are used for explaining the present disclosure, instead of limiting the present disclosure.

The main idea of the present disclosure is as follows. Increase number of samples used for measuring a CSI-RS, so as to improve the measurement accuracy, by enabling a UE to measure a CSI-RS RSRP or a CSI-RS RSRQ utilizing multiple CSI-RS resources.

The technical solution provided by the present disclosure, which is to measure a CSI-RS by utilizing multiple CSI-RS resources, may be used to measure the CSI-RS RSRP, or the CSI-RS RSRQ. Descriptions are provided in the following, in which measure the CSI-RS RSRP is taken as an example.

FIG. 1 is a schematic diagram illustrating REs mapping of a CSI-RS resource in a subframe, when there are two antenna ports in the prior art. Based on numbers in FIG. 1, it can be seen that there are 20 CSI-RS configurations, each CSI-RS resource in one RB may be mapped to 2 REs.

To achieve the above objections, the present disclosure provides a method for measuring a CSI-RS RSRP. As shown in FIG. 2, the method may include the following blocks.

S110, a UE receives a signaling, which may indicate a combination of multiple CSI-RS resources, which corresponds to a measured CSI-RS RSRP, and corresponding configuration information.

In block S110, the combination mode about the multiple CSI-RS resources, which corresponds to the measured CSI-RS RSRP, may include at least one of the following.

A first combination mode is a frequency domain combination mode. That is, select and combine multiple CSI-RS resources, by using CSI-RS configuration. For example, in an example illustrated with FIG. 4, select and combine CSI-RS resources, in which the RS configurations thereof are respectively 0 and 5.

A second combination mode is a time domain combination mode. That is, select and combine RS resources in different subframes, by using subframe information about a CSI-RS configuration. For example, in the example illustrated with FIG. 5, select and combine CSI-RS resources, the RS subframe configurations of which in different subframes are respectively 15, 16 and 17.

In block S110, when selecting CSI-RS resources and combining multiple CSI-RS resources, a selection mode may be any of the follows.

A first selection mode may be as follows. Randomly select CSI-RS resources from optional CSI-RS resources to be combined.

A second selection mode may be as follows. Select and combine CSI-RS resources with stronger correlation, according to CSI correlation characteristics of a time frequency domain. Stronger correlation of each CSI in the combination of CSI-RS resources may be guaranteed, by selecting and combining CSI-RS resources with adjacent time frequency domains, according to the CSI correlation characteristics. Subsequently, noise elimination operations performed by a UE on multiple CSI-RS resources may be facilitated. Meanwhile, RS RSRP accuracy estimated by the UE may also be improved.

As shown in FIG. 4, when taking the correlation of time frequency domain into consideration, select and combine resources with a same time domain and an adjacent frequency from a same subframe, e.g., combine CSI-RS resources, the RS configurations of which are respectively 0 and 5.

As shown in FIG. 5, when taking into account the correlation of time frequency domain, select CSI-RS resources with a same period and an adjacent time domain, by selecting CSI-RS subframe configurations among different subframes. For example, select and combine RS resources, the RS subframe configurations of which are respectively 15, 16 and 17. Subsequently, the RS resources of the combination are in adjacent subframes 0, 1 and 2.

In block S110, a combination about multiple CSI-RS obtained by a UE is based on a CSI-RS resource mapping of a new design. A design principle for redesigning a CSI-RS may be as follows. Introduce new CSI-RS resources adjacent to a time frequency location of existing CSI-RS resources, so as to increase number of configured CSI-RS combinations. Alternatively, modify a location mapped to by existing CSI-RS resources, which will be described in the following with an example.

FIG. 6 is a schematic diagram illustrating comparison of a REs mapping about a CSI-RS resource, which is put forward by an example of the present disclosure, with that in the prior art. The left part in FIG. 6 illustrates an REs mapping about an existing CSI-RS resource. The right part in FIG. 6 illustrates an REs mapping about a CSI-RS resource, in accordance with an example of the present disclosure. In the example of the present disclosure, 8 CSI-RS resources may be newly added (when antenna port number is larger than 2, there are RSs at the locations with resource numbers 24, 25, 26 and 27. That is, resources with numbers 24, 25,26 and 27 may be available when antenna port number is smaller than or equal to 2), by modifying an REs mapping of CSI-RS resource. Subsequently, number of available CSI-RS resources may be increased. Meanwhile, compatibility with an existing resource mapping may be guaranteed, and adjacency in a time frequency domain of CSI-RS resources may also be guaranteed.

In block S110, the signaling indicating the combination of multiple CSI-RS resources, which is obtained by the UE, may include at least one kind of the following information.

1) Antenna port number;

2) number of CSI-RS resources within the combination, that is, size of the combination about multiple CSI-RS resources, which may be configured, or adjusted correspondingly according to antenna port number. Density of REs within the combination of CSI-RS resources may be defined. For example, density of element number within the combination of CSI-RSs may be guaranteed is not smaller than 4 or 8 per RB. Thus, when antenna port number is 1, 2, 4 and 8, size of a corresponding combination is respectively {2,2, 1,1} or {4,4,2,1};

3) CSI-RS configurations within the combination. The signaling may provide a specific configuration combination, e.g., denote to select and combine RS resources with resource configurations 0 and 5, by employing {0,5} in the signaling. Alternatively, all of the available resource configurations may be selected, combined, numbered and indicated with a corresponding number, according to a principle of adjacent time frequency location of CSI-RSs in the combination. The foregoing mode may be described in the following with examples illustrated with Table 1 and Table 2.

Table 1 lists a mapping about existing resources. That is, for 1 antenna port or 2 antenna ports (which may be referred to as 1/2 antenna port in the following), all of the resource combinations when combination sizes are 2,3 and 4.

TABLE 1

| antenna port number is 1/2 | | | |
|---|---|---|---|
| number | corresponding CSI-RS configuration combination | number | corresponding CSI-RS configuration combination |
| combination size is 2 | | | |
| 0 | {0, 5} | 5 | {12, 13} |
| 1 | {10, 11} | 6 | {14, 15} |
| 2 | {1, 6} | 7 | {16, 17} |
| 3 | {2, 7} | 8 | {4, 9} |
| 4 | {3, 8} | 9 | {18, 19} |
| combination size is 3 | | | |
| 0 | {1, 6, 2} | 4 | {0, 5, 4} |
| 1 | {7, 3, 8} | 4* | {0, 5, 9} |
| 2 | {12, 13, 14} | 5 | {10, 11, 18} |
| 3 | {15, 16, 17} | 5* | {10, 11, 19} |
| combination size is 4 | | | |
| 0 | {0, 5, 10, 11} | 3 | {1, 6, 2, 7} |
| 1 | {3, 8, 12, 13} | 4 | {14, 15, 16, 17} |
| 2 | {4, 9, 18, 19} | | |

Table 2 lists a resource mapping put forward by an example of the present disclosure, as shown in the right part of FIG. 6. That is, for the antenna port number is 1/2, all of the resource combinations when the combination sizes are 2,3 and 4.

TABLE 2 antenna port number is 1/2

| number | corresponding CSI-RS configuration combination | number | corresponding CSI-RS configuration combination |
|---|---|---|---|
| combination size is 2 ||||
| 0 | {0, 5} | 5 | {12, 13} |
| 1 | {10, 11} | 6 | {14, 15} |
| 2 | {1, 6} | 7 | {16, 17} |
| 3 | {2, 7} | 8 | {4, 9} |
| 4 | {3, 8} | 9 | {18, 19} |
| 10 | {20, 21} | 11 | {22, 23} |
| 12* | {24, 25} | 13* | {26, 27} |
| combination size is 3 ||||
| 0 | {1, 6, 2} | 4* | {0, 5, 20} |
| 1 | {7, 3, 8} | 5* | {21, 10, 11} |
| 2 | {12, 13, 14} | 6* | {4, 9, 22} |
| 3 | {15, 16, 17} | 7* | {23, 18, 19} |
| combination size is 4 ||||
| 0* | {24, 0, 5, 20} | 3 | {1, 6, 2, 7} |
| 1 | {3, 8, 12, 13} | 4 | {14, 15, 16, 17} |
| 2* | {25, 21, 10, 11} | 5* | {26, 4, 9, 22} |
| 3* | {27, 23, 18, 19} | | |

In Table 1 and Table 2, a combination corresponding to label "*"may denote an optional combination.

According to Table 1, suppose a combination number received by a UE is 0, and combination size is 2, it can be seen that the resource configuration combination within current combination is {0, 5}. In addition, according to a principle of adjacent frequency of resource combination, it may only provide the combination size and RS configuration in a combination, the frequency domain of REs of the RS configuration in the combination is the highest or lowest. For example, when the combination size is 2 and the highest resource configuration in frequency domain is 0, it can be seen that the resource combination is {0, 5}.

4) CSI-RS resource subframe configuration in the combination. The signaling may provide a specific configuration combination, e.g., {15, 16, 17} denotes to combine resources, the subframe configurations of which are {15, 16, 17}. Alternatively, the signaling may provide the combination size and the first subframe configuration of resources within the combination, e.g., when the combination size is 3 and the first subframe configuration is 15, it can be seen that the subframe configuration set is {15, 16, 17}.

S120, the UE may obtain a resource location corresponding to the combination of multiple CSI-RS resources, and corresponding configuration information, according to the received signaling.

In the block, a mode for the UE to obtain the combination of CSI-RS resources, which corresponds to the measured CSI-RS RSRP, and corresponding configuration information, depends on a mode carrying corresponding information by the signaling in block S110. Specifically speaking, the combination of CSI-RS resources corresponding to the measured CSI-RS RSRP, and corresponding configuration information may be obtained with the following modes.

A first obtaining mode is to obtain according to a definition principle. The signaling may provide the combination size and RS configuration, the frequency domain of which is the highest or lowest in the combination. For example, when the provided combination size is 2, and the highest resource configuration is 0, it can be seen that the resource combination is {0, 5} following the pre-defined principle. Alternatively, the signaling may provide the combination size and the first subframe configuration of resource within the combination. For example, when combination size is 3, and the initial subframe configuration is 15, it can be seen that the obtained subframe configuration set is {15, 16, 17}.

A second obtaining mode is as follows. Specify a pre-defined table in specification. The signaling may provide the combination size and pre-defined index of resource combination. Subsequently, the UE may search in the pre-defined table, so as to obtain specific configuration information about resources within the combination, according to the signaling. For example, based on Table 1, when the combination index received by the UE is 0, and meanwhile the combination size is 2, it can be seen that the resource configuration combination within current combination is {0,5}.

A third obtaining mode is as follows. The signaling may provide a specific combination. Subsequently, after receiving the signaling, the UE may acknowledge the CSI-RS configuration of the combination.

S130, the UE may measure a CSI-RS RSRP at a corresponding resource location, and report a measurement report.

The UE may measure the CSI-RS RSRP by using corresponding multiple CSI-RS resources, and report the measurement result about the CSI-RS RSRP.

The measurement about the CSI-RS RSRP in block S130 must be performed, according to the multiple CSI-RS resources indicated by the signaling. The single CSI-RS power, and/or, signal quality are obtained. Subsequently, number of samples used for measuring CSI-RS may be increased, so as to improve measurement accuracy.

The RS in the present disclosure may include a cell specific RS or a UE specific RS.

As shown in FIG. 3, an example of the present disclosure may also provide a UE, which includes a receiving module 310, a measuring module 320 and a transmitting module 330.

The receiving module 310 is configured to receive a signaling, and obtain from the signaling a multiple CSI-RS resource combination, which corresponds to the measured CSI-RS RSRP, and/or, the measured CSI-RS RSRQ, as well as corresponding configuration information.

The measuring module 320 is configured to obtain a resource location corresponding to the multiple CSI-RS combination, which is indicated by the signaling, and measure the CSI-RS RSRP, and/or, CSI-RS RSRQ, at the obtained resource location. The measurement about the CSI-RS RSRP, and/or, CSI-RS RSRQ, should be based on the multiple CSI-RS resources currently configured. Subsequently, a measurement result of a single CSI-RS RSRP or CSI-RS RSRQ may be obtained.

The transmitting module 330 is configured to transmit the measurement result obtained by the measuring module.

Preferably, the receiving module 310 may receive a broadcast message or radio resource configuration message transmitted by a Base Station (BS), and obtain information about the multiple CSI-RS resource combination from the received broadcast message or radio resource configuration message.

In accordance with the foregoing method or UE put forward by the present disclosure, measurement about CSI-RS RSRP or CSI-RS RSRQ may be implemented, by using multiple CSI-RS resources. Subsequently, available sample number about REs used for measuring CSI-RS RSRP may be increased, so as to effectively improve the measurement accuracy about CSI-RS RSRP or CSI-RS RSRQ measured by a UE. Meanwhile, by configuring the multiple CSI-RS resources, enough measurement accuracy may also be guaranteed, when the measurement bandwidth is relatively small, so as to avoid measuring by a UE with too large measurement bandwidth, or avoid a long measurement period about the CSI-RS RSRP and CSI-RS RSRQ. Subsequently, system complexity and UE consumption may be effectively guaranteed. In addition, by employing the foregoing technical solution put forward by the present disclosure, modification to an existing system is small, and system compatibility may not be affected. Meanwhile, implementation about the technical solution put forward by the present disclosure is simple and efficient.

To facilitate to understand the present disclosure, detailed descriptions will be provided in the following, by taking a specific application scene as an example.

FIG. 7 is a flowchart illustrating an application scene when a configured multiple CSI-RS resource combination is resource configurations 0 and 5 of a same subframe, in accordance with an example of the present disclosure.

A first application scene is as illustrated in FIG. 7. The configured multiple CSI-RS resource combination is resource configurations 0 and 5 of a same subframe.

As shown in FIG. 1 and FIG. 4, the application scene describes that, the multiple CSI-RS resource combination configured by a BS may be implemented, by selecting different CSI-RS configurations of a same subframe, the dependent mapping about CSI-RS resources of which is in the prior art. Meanwhile, the designed signaling is as follows. Indicate the combination size and a specific resource configuration set corresponding to the combination, so as to inform a UE about configuration information of current multiple CSI-RS resource combination.

Block 701, a BS may inform a UE about information regarding multiple CSI-RS resource combination configured currently, by using system information. The specific signaling contents may be as follows.

The antenna port number is 2;
resource number within the combination is 2;
CSI-RS resource configuration set within the combination is {0, 5}; and
resource subframe configuration within the combination is 15.

Block 702, the UE may receive the configuration information about the multiple CSI-RS resource combination, and acknowledge current multiple CSI-RS configuration is {0, 5}, according to the system information.

Block 703, the UE may perform a noise elimination on REs at a corresponding resource location, according to the obtained multiple CSI-RS configuration, and measure the CSI-RS RSRP.

Block 704, the UE may report the measured CSI-RS RSRP, which is obtained after measuring, within a measurement time.

FIG. 8 is a flowchart illustrating another application scene when a configured multiple CSI-RS resource combination is resources 0 and 5 of a same subframe of a newly designed resource mapping, in accordance with an example of the present disclosure.

A second application scene is as illustrated in FIG. 8. The configured multiple CSI-RS resource combination is resources 0 and 5 of a same subframe of a newly designed resource mapping.

As shown in FIG. 6 and FIG. 4, the application scene describes a BS to combine the multiple CSI-RS resources, by using different resource configurations of a same subframe, based on a newly designed resource mapping (as shown in FIG. 6). Meanwhile, according to the designed number illustrated with Table 2, the signaling contents may include: indications of combination size and combination index about resource configuration corresponding to the combination, so as to inform a UE about configuration information of current multiple CSI-RS resource combination.

Block 801, a BS may inform a UE about information regarding multiple CSI-RS resource combination current configured, by using system information. The specific signaling contents may be as follows.

The antenna port number is 2;
resource number within the combination is 2;
resource number of the combination is 0; and
the resource subframe configuration of the combination is 15.

Block 802, the UE may receive configuration information about the multiple CSI-RS resource combination, acknowledge resource number of current multiple CSI-RS is 0, according to the system information, and lookup in Table 2, so as to acknowledge that the resource configuration about current multiple CSI-RS resource combination is {0,5}.

Block 803, the UE may perform a noise elimination on REs at corresponding resource locations, according to the obtained multiple CSI-RS configuration, and measure the CSI-RS RSRP.

Block 804, the UE may report a measurement power about the CSI-RS, which is obtained after measuring, within a measurement time.

FIG. 9 is a flowchart illustrating another application scene when a configured multiple CSI-RS resource combination is CSI-RS resources configured for different subframes, in accordance with an example of the present disclosure.

A third application scene is as illustrated in FIG. 9. The configured multiple CSI-RS resource combination is CSI-RS resources configured for different subframes.

As shown in FIG. 5, the application scene describes that, a BS may combine multiple CSI-RS resources at an adjacent subframe, by selecting different subframe configurations. A corresponding signaling is to indicate the combination size, and a resource subframe configuration set corresponding to the combination, so as to inform a UE about configuration information of current multiple CSI-RS resource combination.

Block 901, a BS may inform a UE about information regarding a multiple CSI-RS resource combination currently configured, by using system information. The specific signaling contents may be as follows.

The antenna port number is 2;
the resource number within the combination is 3;
resource configuration of the combination is 0; and
resource subframe configuration set of the combination is {15, 16, 17}.

Block 902, the UE may receive the configuration information about the multiple CSI-RS resource combination, and learn that current multiple CSI-RS configuration is 0, a corresponding subframe is {0, 1, 2}, and a transmitting period is 20 ms, according to the system information.

Block 903, the UE may perform a noise elimination on REs at corresponding resource locations of 3 adjacent subframes, according to the obtained multiple CSI-RS configuration, and measure the CSI-RS RSRP.

Block 904, the UE may report a measurement power of the CSI-RS, which is obtained after measuring, within a measurement time.

Persons having ordinary skill in the art may understand that, all of or part of blocks in foregoing method example may be completed with relevant hardware, which is instructed by a program. The program may be stored into a computer readable storage medium. When executing the program, at least one block of foregoing method example may be completed.

In addition, a functional unit of each example of the present disclosure may be integrated into a processing module, or may physically and independently exist as each unit, still or, at least two of which may be integrated into a module. The foregoing integrated module may be implemented with hardware, or software functional module. When the integrated module is implemented in the manner of software functional module, meanwhile is sold or used as an independent product, the integrated module may be stored into a computer readable storage medium.

The foregoing storage medium may be a Read-Only Memory (ROM), a disk, or a Compact Disk (CD), and so on.

The foregoing is only preferred examples of the present disclosure, which is not used for limiting the present disclosure. Any modifications, equivalent substitutions and improvements made within the spirit and principle of the present disclosure, should be covered by the protection scope of the present disclosure.

The invention claimed is:

1. A method to measure a channel state indication (CSI)-reference signal (RS) in a user equipment (UE), the method comprising:
receiving a signal including configuration information and combination information, the combination information indicating a combination of at least two CSI-RS resources selected from among a plurality of CSI-RS resources;
obtaining a resource location based on the combination information and the configuration information; and
measuring the CSI-RS based on the resource location,
wherein the at least two CSI-RS resources indicated by the combination information are located adjacent to each other on a frequency domain, and
wherein the plurality of CSI-RS resources are represented as symbols 5 to 6 of subcarriers 2 to 4 and 7 to 9, symbols 9 to 10 of all subcarriers, and symbols 12 to 13 of subcarriers 2 to 4 and 7 to 9, if an antenna port number is larger than 2, and the plurality of CSI-RS resources are represented as symbols 5 to 6 of subcarriers 2 to 5 and 7 to 10, symbols 9 to 10 of all subcarriers, and symbols 12 to 13 of subcarriers 2 to 5 and 7 to 10, if the antenna port number is smaller or equal to 2.

2. The method according to claim 1, further comprising:
reporting a measurement result of the CSI-RS,
wherein the measuring of the CSI-RS comprises measuring at least one of a CSI-RS receiving power (RSRP) or a CSI-RS receiving quality (RSRQ).

3. The method according to claim 1, wherein the combination information comprises at least one of:
the antenna port number related to the at least two CSI-RS resources;
a size of the combination of the at least two CSI-RS resources;
an index of the combination of the at least two CSI-RS resources;
a number of the at least two CSI-RS resources;
a CSI-RS subframe configuration set related to the at least two CSI-RS resources; and
a CSI-RS configuration within the at least two CSI-RS resources.

4. The method according to claim 1, wherein the at least two CSI-RS resources indicated by the combination information are located on a same subframe.

5. The method according to claim 1, wherein the at least two CSI-RS resources
are randomly selected from among the plurality of CSI-RS resources.

6. The method according to claim 1, wherein the measuring of the CSI-RS comprises:
performing a noise elimination on a resource elements (REs) corresponding to the resource location, and
measuring the CSI-RS on the noise eliminated REs within a measurement time.

7. The method according to claim 1, wherein a size of the combination is determined based on the antenna port number.

8. A user equipment (UE) to measure a channel state indication (CSI)-reference signal (RS), the UE comprising:
a transceiver; and
at least one processor coupled to the transceiver, wherein the processor is configured to: receive a signal including configuration information and combination information the combination information indicating a combination of at least two CSI-RS resources selected from among a plurality of CSI-RS resources ; and
obtain a resource location based on the combination information and the configuration information; and
measure the CSI-RS based on the resource location,
wherein the at least two CSI-RS resources indicated by the combination information are located adjacent to each other on a frequency domain, and
wherein the plurality of CSI-RS resources are represented as symbols 5 to 6 of subcarriers 2 to 4 and 7 to 9, symbols 9 to 10 of all subcarriers, and symbols 12 to 13 of subcarriers 2 to 4 and 7 to 9, if an antenna port number is larger than 2, and the plurality of CSI-RS resources are represented as symbols 5 to 6 of subcarriers 2 to 5 and 7 to 10, symbols 9 to 10 of all subcarriers, and symbols 12 to 13 of subcarriers 2 to 5 and 7 to 10, if the antenna port number is smaller than or equal to 2.

9. The UE according to claim 8,
wherein the processor is configured to transmit a measurement result of the CSI-RS,
wherein the measurement result is generated based on measuring at least one of a CSI-RS receiving power (RSRP) and a CSI-RS receiving quality (RSRQ).

10. The UE according to claim 9, wherein the combination information comprises at least one of:
the antenna port number related to the at least two CSI-RS resources;
a size of the combination of the at least two CSI-RS resources;
an index of the combination of the at least two CSI-RS resources;
a number of the at least two CSI-RS resources;
a CSI-RS subframe configuration set related to the at least two CSI-RS resources; and
a CSI-RS configuration within the at least two CSI-RS resources.

11. The UE according to claim 8, wherein the at least two CSI-RS resources indicated by the combination information are located on a same subframe.

12. The UE according to claim 8, wherein the at least two CSI-RS resources
are randomly selected from among the plurality of CSI-RS resources.

13. The UE according to claim 8, wherein a size of the combination is determined based on the antenna port number.

14. The UE according to claim 8, wherein the at least one processor is further configured to:
- perform a noise elimination on a resource elements (REs) corresponding to the resource location, and
- measure the CSI-RS on the noise eliminated REs within a measurement time.

* * * * *